(12) United States Patent  (10) Patent No.: US 7,859,778 B1
Vikramaditya et al.  (45) Date of Patent: Dec. 28, 2010

(54) DETERMINISTIC PHASE MISMATCH CORRECTION IN SERVO POSITION ESTIMATION SYSTEMS

(75) Inventors: Barmeshwar Vikramaditya, Eden Prairie, MN (US); Patrick John Korkowski, Bloomington, MN (US); Richard Lyle Keizer, Minnetonka, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 221 days.

(21) Appl. No.: 11/866,659

(22) Filed: Feb. 21, 2008

(51) Int. Cl.
*G11B 20/20* (2006.01)
*G11B 5/596* (2006.01)
(52) U.S. Cl. .................................. 360/26; 360/77.07
(58) Field of Classification Search .................. None
See application file for complete search history.

(56) References Cited

U.S. PATENT DOCUMENTS

| 6,608,477 | B2 | 8/2003 | Sacks et al. | 324/210 |
| 6,853,514 | B2 | 2/2005 | Li et al. | 360/77.04 |
| 6,980,389 | B1 | 12/2005 | Kupferman | 360/77 |
| 7,064,914 | B1 | 6/2006 | Erden et al. | 360/31 |
| 2003/0112546 | A1 | 6/2003 | Hanson et al. | 360/77.04 |
| 2006/0245105 | A1* | 11/2006 | Asakura et al. | 360/77.06 |
| 2007/0025003 | A1 | 2/2007 | Erden et al. | 360/29 |

* cited by examiner

*Primary Examiner*—Jason C Olson
(74) *Attorney, Agent, or Firm*—David D. Brush; Westman, Champlin & Kelly, P.A.

(57) ABSTRACT

A method includes estimating a phase difference between components of a position signal in a servo position estimation system, and correcting the phase difference of the components of the position signal to provide a phase-compensated position signal.

21 Claims, 7 Drawing Sheets

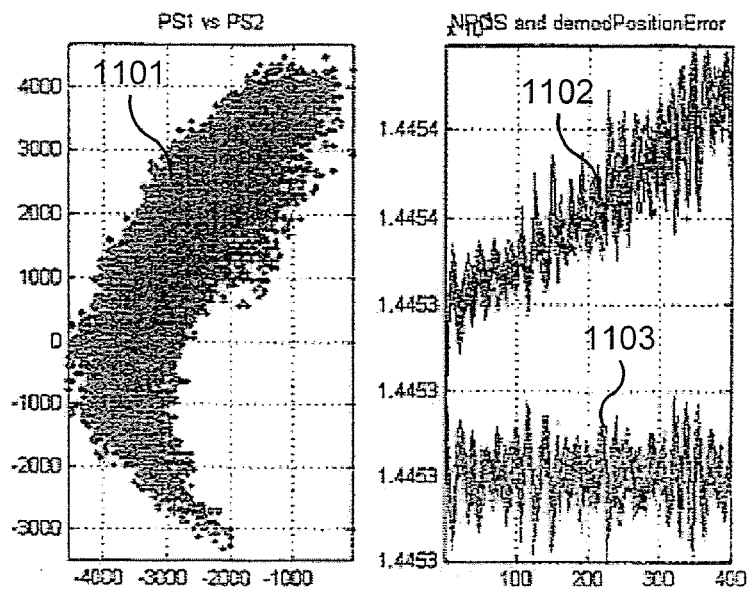
*Figure 11A*  *Figure 11B*
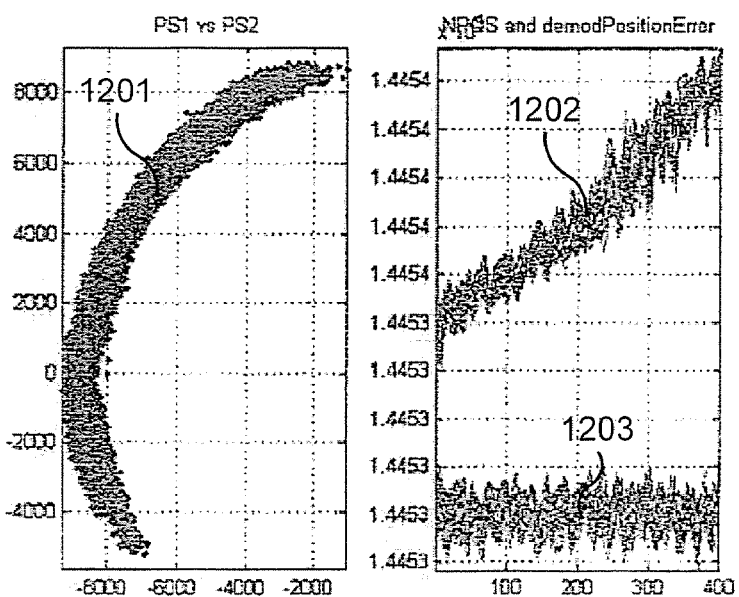
*Figure 12A*  *Figure 12B*

US 7,859,778 B1

DETERMINISTIC PHASE MISMATCH CORRECTION IN SERVO POSITION ESTIMATION SYSTEMS

BACKGROUND

The present invention generally relates to servo systems and, more particularly, to compensating phase errors in a position control signal in a servo position estimation system.

Computer disc drives store information on discs or platters. Typically, the information is stored on each disc in tracks. The data tracks are usually divided into sectors. Information is written to and read from a storage surface(s) of a disc by a read/write head. The read/write head may include a read element separate from a write element, or the read and write elements may be integrated into a single read/write element. The read/write head is mounted on an actuator arm capable of moving the read/write head radially over the disc. Accordingly, the movement of the actuator arm allows the read/write head to access different data tracks.

The disc is rotated by a spindle motor at a high speed, allowing the read/write head to access different sectors within each track on the disc. The actuator arm is coupled to a motor or coarse actuator, such as a voice coil motor (VCM), to move the actuator arm such that the read/write head moves radially over the disc. Operation of the coarse actuator is controlled by a servo control system. The surface of the disc contains a plurality of data tracks that are divided into a plurality of data sectors. In addition to the data sectors, servo control information is embedded on the disc. The embedded servo information, which is typically included in servo sectors that are adjacent to the data sectors, is used to determine the location of the read/write head on the disc. A servo sector generally includes a track identification (ID) field and a group of servo bursts that the servo control system samples to align the read/write head with or relative to a particular data track.

The servo control system generally performs two distinct functions: seek control and track following. The seek control function includes controllably moving the actuator arm such that the read/write head is moved from an initial position to a target track position using the track ID field as a control input.

In general, the seek function is initiated when a host computer associated with the disc drive issues a command to read data from or write data to a target track on the disc. Once the read/write head has been moved sufficiently close to the target track by the seek function of the control system, the track following function of the servo control system is activated to center and maintain the read/write head on the target track until the desired data transfers are completed.

Once the read/write head is over the desired track, the servo control system uses the servo bursts in a "track following" mode to keep the read/write head over that track. That is, the servo control system attempts to maintain the position of the read/write head over a centerline of the track. Typically, the read/write head must be moved slightly during track following to maintain a desired position over the track, because the track may not be perfectly circular on the disc and/or there may be some eccentricity in the rotation of the disc about the disc spindle.

The servo bursts typically include groups of discrete servo bursts that are formed in succession on a track and are disposed at predetermined radial positions on the disc relative to a track centerline. Some of the bursts may be regarded as in-phase bursts, while other bursts are radially offset from and overlap the in-phase bursts, so that they are located in quadrature. Signals generated in response to the servo bursts can be used to determine displacement of the read/write head from the centerline of the data track using various servo demodulation schemes. Various schemes of servo position encoding have been used in the industry including split-burst amplitude patterns, null servo patterns, phase patterns, dual-frequency patterns etc.

SUMMARY

Methods according to some embodiments include estimating a phase difference between components of a position signal in a servo control system, and correcting the phase difference of the components of the position signal to provide a phase-compensated position signal.

In some embodiments, a servo burst signal is demodulated to obtain a position signal including a plurality of signal components, and a phase difference of the components of the position signal is corrected to provide a phase-compensated position signal using an estimate of the phase difference between the components of the position signal.

A servo control system according to some embodiments includes a demodulator that demodulates a servo burst signal to obtain a position signal including a plurality of signal components, and a phase correction unit that corrects a phase difference of the components of the position signal to provide a phase-compensated position signal using an estimate of the phase difference between the components of the position signal.

DESCRIPTION OF THE DRAWINGS

FIGS. 11A and 11B are graphs of measured position signal information for a disc drive without phase correction.

FIGS. 12A and 12B are graphs of measured position signal information for a disc drive with phase correction according to some embodiments.

DETAILED DESCRIPTION

The present invention now will be described more fully hereinafter with reference to the accompanying drawings, in which various embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings of the present invention.

The present invention may be embodied in hardware (analog and/or discrete) and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disc drives, discs, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
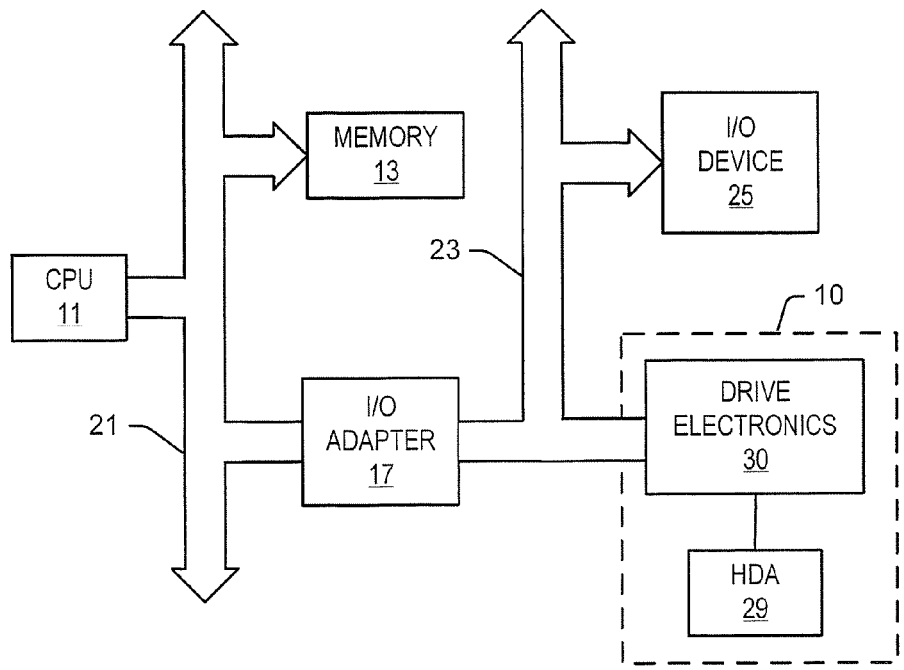
FIG. 1 is a block diagram illustrating a computer system including a disc drive according to some embodiments.

Referring to FIG. 1, an exemplary computer system is shown that includes a central processing unit ("CPU") 11, a main memory 13, and I/O bus adapter 17, all interconnected by a system bus 21. Coupled to the I/O bus adapter 17 is I/O bus 23, that may be, for example, a small computer system interconnect (SCSI) bus, firewire bus, and/or a universal serial bus. The I/O bus 23 supports various peripheral devices 25 and a data storage unit such as a disc drive 10. The disc drive 10 includes drive electronics 30 and a head disc assembly 29 ("HDA").

Figure 2:
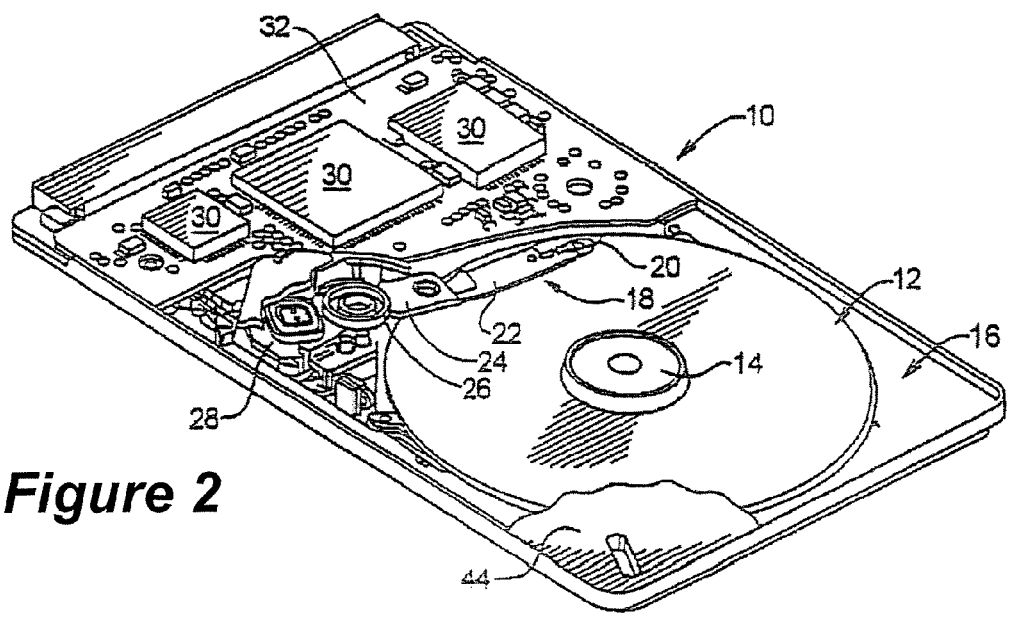
FIG. 2 is a perspective view of a disc drive that is configured in accordance with some embodiments.
Figure 3:
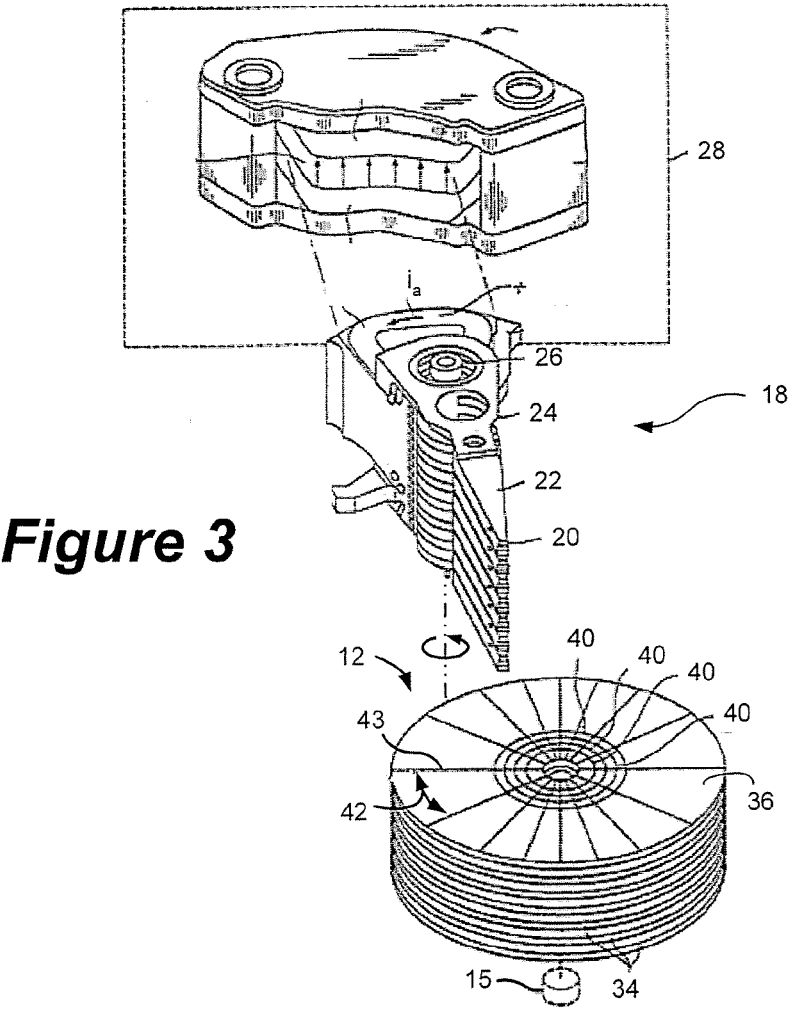
FIG. 3 is an exploded perspective diagram of a disc stack having a plurality of data storage discs along with an actuator assembly.

A simplified diagrammatic representation of a disc drive, generally designated as 10, is illustrated in FIG. 2. The disc drive 10 includes a disc stack 12 (illustrated as a single disc in FIG. 2) that is rotated about a hub 14 by a spindle motor 15 (FIG. 3). The spindle motor 15 is mounted to a base plate 16. An actuator aim assembly 18 is also mounted to the base plate 16. The disc drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disc drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a giant magnetoresistive (GMR) element and/or a thin film inductive (TFI) element. The actuator arm assembly 18 also includes a voice coil motor (VCM) actuator 28 which radially moves the head 20 across the disc stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 3, the disc stack 12 typically includes a plurality of discs 34, each of which may have a pair of disc surfaces 36. The discs 34 are mounted on a cylindrical shaft and are rotated about an axis by the spindle motor 15.

The actuator arm assembly 18 includes a plurality of the heads 20, each of which is positioned to be adjacent to a different one of the disc surfaces 36. Each head 20 is mounted to a corresponding one of the flexure arms 22. The VCM actuator 28 operates to move the actuator arm 24, and thus moves the heads 20 across their respective disc surfaces 36. The heads 20 are configured to fly on an air cushion relative to the data recording surfaces 36 of the rotating discs 34 while writing data to the data recording surface responsive to a write command from a host device or while reading data from the data recording surface to generate a read signal responsive to a read command from the host device.

Figure 4:
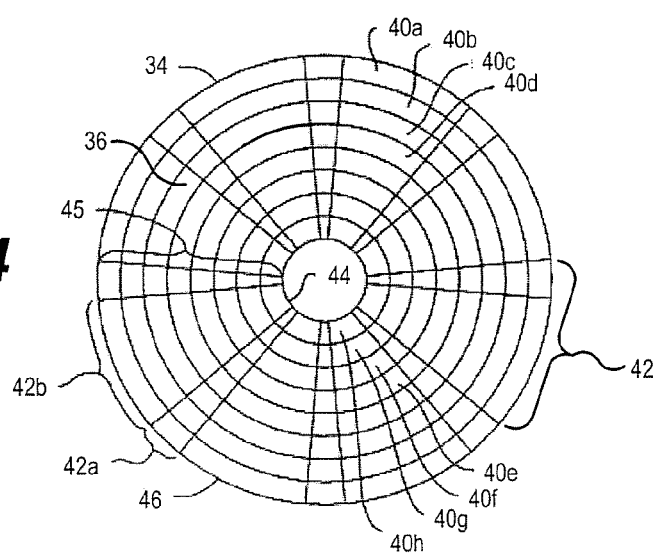
FIG. 4 is a plan view of a disc including a plurality of tracks including servo sectors and data sectors.

FIG. 3 further illustrates tracks 40 and spokes 43 on the discs 34. Data is stored on the discs 34 within a number of tracks 40 (or cylinders). Each track 40 is divided into a plurality of sectors 42 separated by radially extending spokes 43. Each sector 42 is further divided into a servo sector 42a and a data sector 42b (FIG. 4). The servo sectors of the discs 34 are used, among other things, to accurately position the head 20 so that data can be properly written onto and read from a selected one of the discs 34. The data sectors are where non-servo related data (i.e., host device data) is stored and retrieved.

FIG. 4 is a simplified diagrammatic representation of a top view of a disc 34 having a surface 36 which has been completely formatted to be used in conjunction with a sectored servo system (also known as an embedded servo system). As illustrated in FIG. 4, the disc 34 includes a plurality of tracks 40a-40h for storing data on the disc's surface 36. Although FIG. 4 only shows a relatively small number of tracks for ease of illustration, it should be appreciated that typically tens of thousands of tracks are included on the surface 36 of a disc 34.

Each track 40a-40h is divided into a plurality of servo sectors 42a and a plurality of data sectors 42b. The servo sectors 42a in each track 40 are radially aligned with servo sectors 42a in the other tracks, thereby forming servo wedges 45 which extend radially across the disc 34 (e.g., from the disc's inner diameter 44 to its outer diameter 46).

Figure 5:
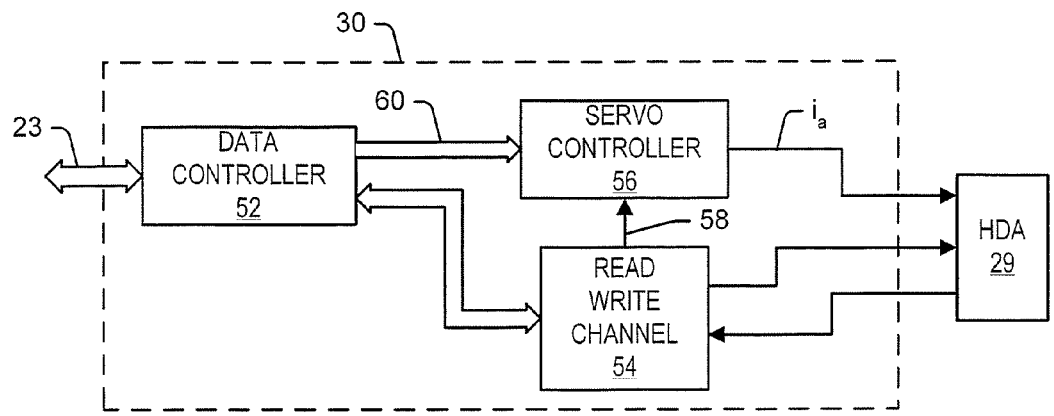
FIG. 5 is a block diagram illustrating drive electronics of a disc drive according to some embodiments.

Referring to FIG. 5, the drive electronics 30 (FIG. 1) includes a data controller 52, a read/write channel 54, and a servo controller 56. A data transfer initiated by the CPU 11 to the disc drive 10 may involve, for example, a DMA transfer of data from the memory 13 onto the system bus 21 (FIG. 1). Data from the system bus 21 are transferred by the I/O adapter 17 onto the I/O bus 23. The data are read from the I/O bus 23 by the data controller 52, which formats the data into blocks with the appropriate header information and transfers the digital data to the read/write channel 54.

The read/write channel 54 can operate in a conventional manner to convert data between the digital form used by the data controller 52 and the analog form used by the transducers 32. For the transfer from the CPU 11 to the HDA 29, the read/write channel 54 converts the data to an analog form suitable for writing by a read/write head 20 to the HDA 29. The read/write channel 54 also provides servo positional information read from the HDA 29 to the servo controller 56 on lines 58. For example, the data tracks 17 on the storage surface of a data disc 30 can be broken up and divided into segments by a plurality of regularly spaced apart embedded servo sectors 42a (FIG. 4). Each servo sector 42a can include transducer location information such as a track identification field and data block address, for identifying the track and data block, and burst fields to provide servo fine location information. The transducer location information can be used to detect the location of the read/write head 20 in relation to that track and data block within the track. The transducer location information is detected as a read back signal by the read/write head 20, converted from analog signals to digital data in the read/write channel 54, and transferred to the servo controller 56. The servo controller 56 can use the transducer location information for performing seek and tracking operations of the read/write head 20 over the disc tracks 40.

The data controller 52 also provides data that identifies the target track location and the addressed data block on lines 60 to the servo controller 56. The time to perform a seek from between an initial track to a target track is typically known as "seek time". The servo controller 56 generates a current command, which is a voltage signal that is converted into the input actuator current $i_a$, and provided to the actuator 28 to move the read/write head 20 radially across the disc 34. The seek time is thus dependent on the magnitude of the current command.

Figure 6:
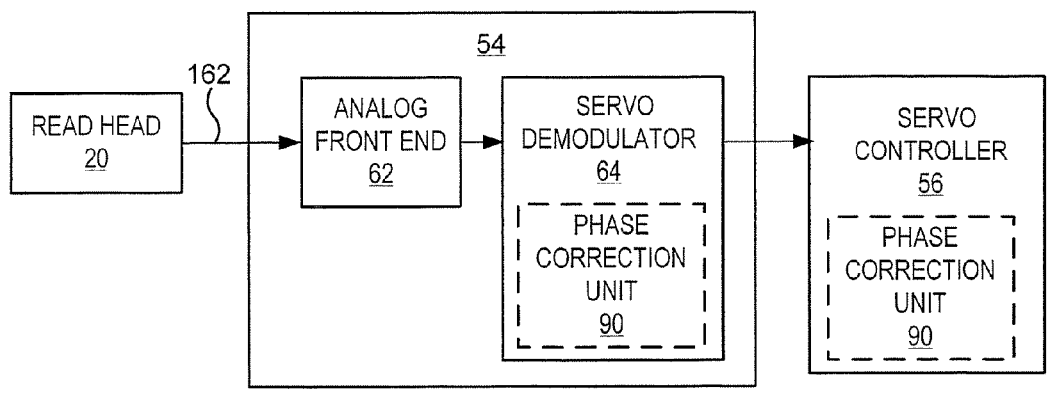
FIG. 6 is a block diagram illustrating a read channel of a disc drive according to some embodiments.

FIG. 6 illustrates some aspects of the drive electronics 26 in further detail. In particular, as shown in FIG. 6, a read back signal 162 is detected by the head 20 and amplified by a preamplifier. This signal is then supplied to an analog front end circuit 62 in the read/write channel 54. The analog front end circuit 62 conditions the read back signal 162 for timing extraction and sampling. The conditioned read back signal 162 is processed by a servo demodulator 64, also in the read/write channel 54, which generates digital in-phase and quadrature components of the position signals PS1, PS2, etc., detected in the read back signal 162, and supplies the digital signals to the servo controller 56 for further processing. As further illustrated in FIG. 6, a phase correction unit 90 can be implemented in the servo demodulator 64 and/or in the servo controller 56. The phase correction unit corrects the phase of sampled components of the read back signal 162, as be described in more detail below.

Figure 7:
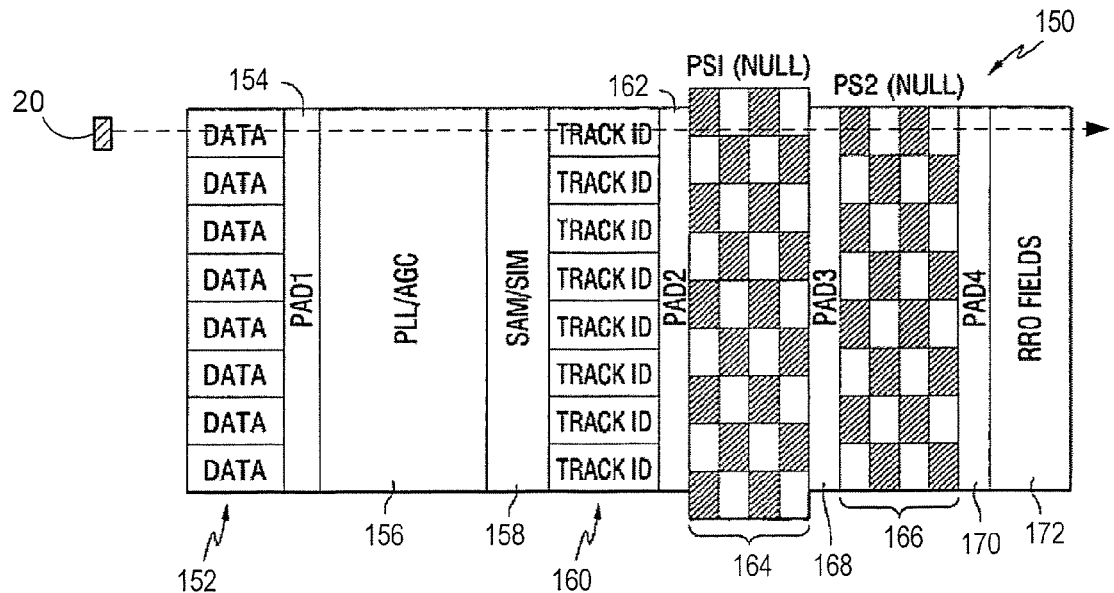
FIG. 7 illustrates exemplary servo information that may be stored in at least some of the servo spokes of a disc drive.
Figure 8:
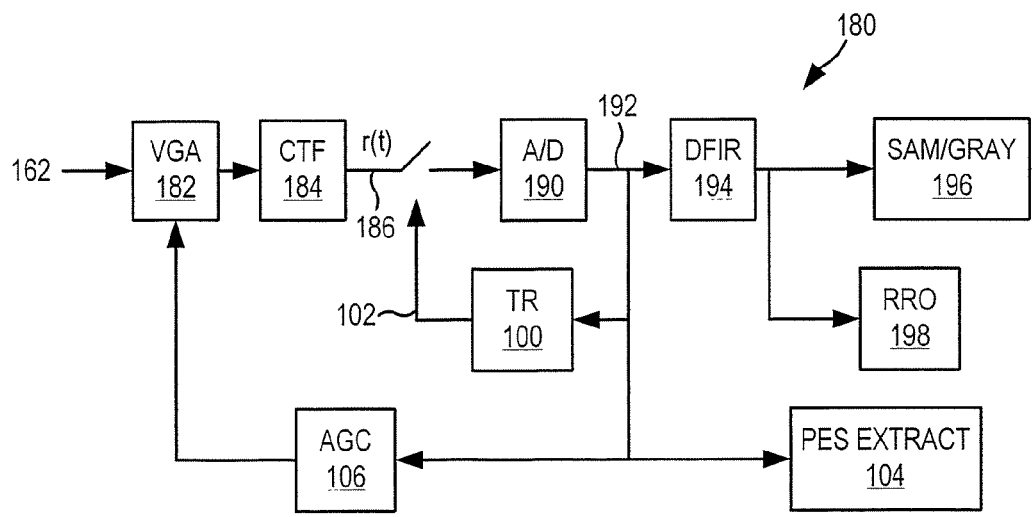
FIG. 8 is a block diagram illustrating a servo demodulator of a disc drive configured according to some embodiments.

A more detailed discussion of the operation of the servo demodulator 64 will be provided with reference to FIGS. 7 and 8. FIG. 7 illustrates an enlarged portion of an example of the format of a typical servo sector (also called an embedded servo sector) 200 on a disc in a disc drive. As explained above, the read back signal 162 detected in response to each servo sector field is processed by the servo demodulator 64. An exemplary architecture of a servo demodulator 300 in accordance with embodiments of the invention is provided in FIG. 8.

It will be understood that the portion of the servo sector 200 illustrated in FIG. 7 is greatly enlarged. Furthermore, in the representation of the servo sector 200 in FIG. 7, the track portions are shown as straight lines. During disc drive operation, a read/write head 20 moves relative to the disc from left to right along a path, such as the path 202, and produces a read back signal (such as read back signal 162 in FIG. 6). The read back signal includes data from servo sector fields of the servo sector. The read back signal is then processed by a servo demodulator (such as servo demodulator 64 in FIG. 6).

FIG. 7 is a schematic representation of a servo sector format 150. After the data sectors 42a and a space 154 (PAD1) in FIG. 7, the servo sector starts with a Phase Locked Loop/ Adaptive Gain Controller (PLL/AGC) field 156. The written data in this field is the same all along the cross-track direction. The PLL/AGC field may be followed by a field 158 containing a Servo Address Mark (SAM) or a Servo Index Mark (SIM). One sector on the disc may include a SIM, and each of the other servo sectors may include a SAM. The SAM/SIM field may be followed by a field 160 containing a gray coded Track ID for each track. The Track IDs may be followed by a space 162 (PAD2) and multiple servo burst patterns 164 and 166 (PS1 and PS2), which may be separated by a space 168 (PAD3). Another space 170 (PAD4) may follow the last burst pattern to form a repeatable runout field 172 that may contain runout information for both read and write operations.

FIG. 8 is a block diagram of the servo demodulator block 64 in FIG. 6, which can be used in one embodiment of the invention. A read back signal 162 is received by a variable gain amplifier (VGA) 182 and filtered by an ac-coupling stage followed by a continuous time filter (CTF) 184 to produce a signal r(t) on line 186. The signal r(t) is sampled, as illustrated by a switch 188, and the sampled signal is converted to a digital signal as illustrated by analog-to-digital converter 190. The resulting digital signal on line 192 is filtered by digital finite impulse response (DFIR) filter 194. Then the SAM/ GRAY code is detected as shown in block 196, and the repeatable runout information is detected as shown in block 198. The output of the analog-to-digital converter, or optionally the output of the detector, is used by a timing recovery circuit 100 to produce a sampling estimate time on line 102. The output of the analog-to-digital converter is also used to extract a position error signal 104 and for an adaptive gain controller 106 to control the variable gain amplifier. While FIG. 8 shows a separate sampling switch 188 and an analog-to-digital converter 190, the sampling function can be performed in the analog-to-digital converter.

As the system reads the PLL/AGC field, the Adaptive Gain Controller (AGC) in FIG. 8 adjusts the gain of Variable Gain Amplifier (VGA). For a synchronous sampling demodulator architecture the Timing Recovery (TR) block recovers the phase and frequency offset in the system so that the Analog-to-Digital (A/D) converter samples the analog signal at the correct sampling instances.

Next, the system reads the SAM/SIM 158 field in FIG. 7, which stores the same data for a Servo Address Mark (SAM) or a Servo Index Mark (SIM) for the cross-track direction. Since it has already adjusted the VGA and recovered the sampling instants, the servo demodulator architecture in FIG. 8 processes the samples of the readback signal corresponding to the SAM/SIM field, and detects the SAM/SIM information using the SAM/GRAY block.

The servo demodulator also detects the Track ID, using the readback signal corresponding to the Track ID field in FIG. 7.

The servo demodulator block next processes the data in servo bursts using PES Extract block in FIG. 8 to extract a plurality of servo position signals (PS1, 2 etc.). The plurality of position signals are sent to the servo controller(s) to determine the Position Error Signal (PES) after commutation and linearization. After the last servo burst field, another space is followed by the Repeatable Run Out (RRO) field. The information in the RRO field is detected using the RRO block in the servo demodulator, and the detected information is also sent to the servo controller(s) At this point the servo controller(s) generates a correction control command to move the actuator to the destination using both the PES and the RRO information.

When the servo bursts are processed, the read back signal 162 may be decomposed into orthogonal sine (SIN) and cosine (COS) components by, for example, correlating and integrating the digitized read back signal on line 192 with a discrete FIR or sampled SIN and COS waveforms. Typically the SIN component of the servo bursts is used solely to generate the position signal (PS) and in turn the plurality of position signals are used to estimate the position error signal (PES).

Typically, there can be a residual error in the estimation of the position signals PS1, PS2, etc. These estimation errors can arise from multiple sources, including, for example, analog front-end set up for a demodulator to handle unique servo patterns, skew mismatch between the servo track writer and a disc drive, deterministic phase error between the servo burst correlator and the written servo pattern, deterministic and repetitive estimation errors in the servo demodulator phase acquisition or frequency acquisition systems, etc. A phase mismatch between the burst correlator and the incoming sampled read back signal results in a leakage of energy into the orthogonal component (SIN or COS), which is rejected during position signal generation. This leads to increased noise in the PES estimation, loss of SNR, increased quantization noise, loss of linearity and resolution, etc.

According to some embodiments of the invention, the orthogonal SIN and COS components of the position signals PS1, PS2, etc., are used together to reconstruct the true position signals in the presence of phase mismatch. Additionally, using the orthogonal SIN and COS components to reconstruct the position signals allows for a decoupling between the requirements for digital detection and servo burst demodulation, which provides flexibility in both pattern writing and demodulator optimization.

According to some embodiments of the invention, a phase difference between components of a position signal in a servo control system is estimated by the phase correction unit 90 (FIG. 6), and the phase difference is corrected to provide a phase compensated position signal. In some embodiments, the phase difference can be corrected in the demodulator, so that the demodulator provides the phase compensated position signal. In other embodiments, the phase difference can be corrected in the servo controller 56.

According to some embodiments, the phase difference is pre-estimated, parameterized, and stored as a function of disc radius and/or down-track location (i.e. as a function of the spoke or wedge on the track at which the phase difference was estimated or detected). Other methods of estimating the phase difference can also be used, as will be described in more detail below.

According to some embodiments, the estimation of the phase difference can be performed one time for a disc drive during initial calibration. As noted above, estimation can be performed at multiple radial locations on the disc if it is expected that the phase difference will vary in a radial fashion and the correction can be parameterized and stored as a function of radial and/or down-track location.

According to some embodiments, both the SIN and COS components for each of the integrated bursts are acquired over multiple resolute revolutions of the disc. These components are averaged to reduce noise, and the average values of the components are used to estimate the deterministic phase difference component.

A plot of the SIN (X-axis) versus COS (Y-axis) distribution is recorded, and a polynomial of a suitable order is fitted to the resulting distribution. For example if the SIN versus COS distribution follows a linear trend, then a line is fitted to the distribution using, for example, a least-squares fit method. The slope of the resulting line is then determined. The inverse tangent of the slope of the fitted line approximates the phase difference between the burst correlator and the servo burst readback signal. This phase difference, Theta, is stored for each servo burst as a function of radius and/or spoke/wedge. It will be appreciated that Theta can be generated and stored as a function of cross track (i.e. radial) location on a given track. That is, the value of Theta can have a sub-track resolution so that it can vary over a single track.

During drive operation, the phase correction unit 90 obtains both the SIN and COS components of each of the servo bursts (PS1, PS2, etc.) and performs a compensation for the phase mismatch as follows:

$$PS(n) = SIN_n * \cos(Theta_n) + COS_n * \sin(Theta_n) \quad (1)$$

where n represents the position signal servo burst in question (PS1, PS2, etc.), $SIN_n$ represents the SIN component of the nth servo burst, and $COS_n$ represents the COS component of the nth servo burst. As noted above, $Theta_n$ can be a function of radial location and/or spoke/wedge location on the disc. Accordingly, a different correction can be applied depending on the radial and/or downtrack location of the read/write head 20 on the disc.

At runtime, the compensation shown in Equation (1) is performed as each servo burst is demodulated. The compensation can be implemented using various other embodiments and is not restricted to being implemented in this manner alone. The compensated position signal is used to generate the position error signal (PES) that is used to adjust the position of the read/write head 20 over the disc. Since the values of Theta, are pre-computed and stored in the drive, the values of sin(Theta) and cos(Theta) can be stored in lookup tables, and may not need to be computed at runtime. Thus, the compensation of the position signals can be performed with minimal additional processing delay.

Figure 9A:
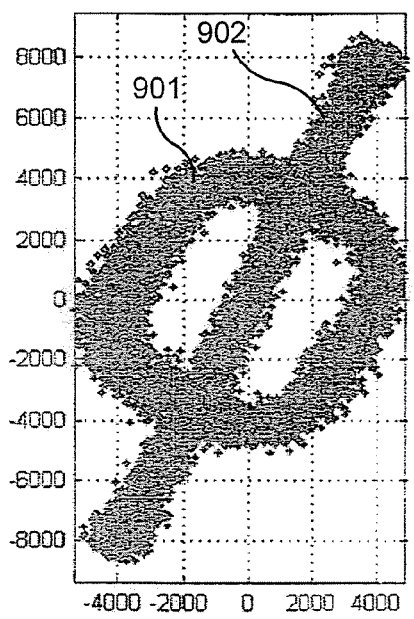
FIGS. 9A and 9B are graphs of measured position signal information for a disc drive without phase correction.

Some effects of phase correction according to embodiments of the invention are illustrated in FIGS. 9A, 9B, 10A and 10B. FIG. 9A includes a plot 901 of the raw (uncompensated) PS1 (X-axis) signal samples versus PS2 (Y-axis) signal samples taken at a predefined radial location on a disc over multiple revolutions, and a plot 902 of the SIN (X-axis) versus COS (Y-axis) components of the PS2 signal. Because the PS1 and PS2 bursts are in quadrature, the plot of PS1 vs PS2 samples falls along a generally circular region. However, the circular region is quite distorted due to phase mismatch of the signals. In the example illustrated in FIG. 9A, the raw PS1 and PS2 signals have a range of about +/−5000 PES counts.

Figure 9B:
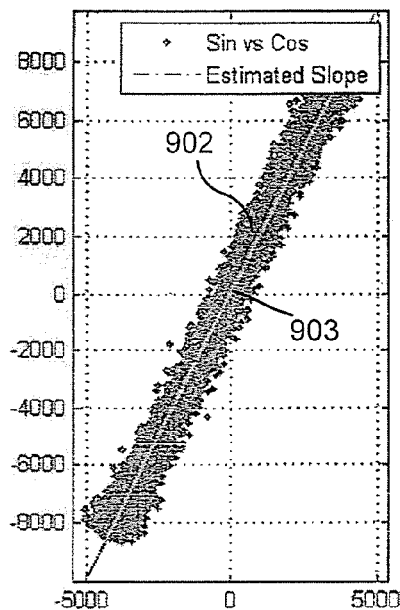

In FIG. 9B, the residual phase error due to phase mismatch is apparent in the burst demodulator integration. The data should all be in the SIN component (X-axis) with the resulting best-fit line being a horizontal line. FIG. 9B shows that a line 903 having nonzero slope can be fit to the plot 902 of the SIN versus COS components of the PS2 signal, for example, using a least-squares approximation. The slope of the line 903 is taken as the phase difference Theta.

Figure 10A:
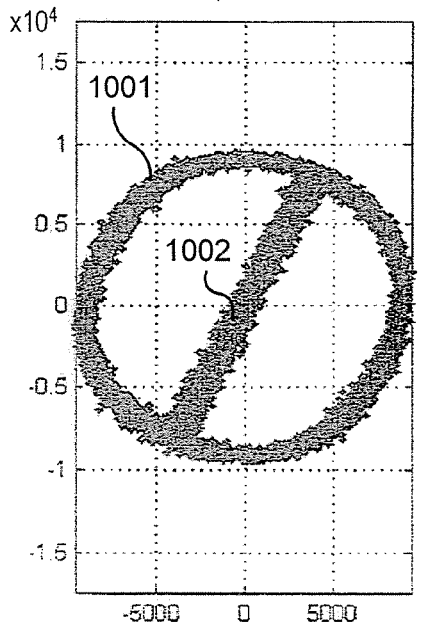
FIGS. 10A and 10B are graphs of measured position signal information for a disc drive with phase correction according to some embodiments.

FIG. 10A is a plot 1001 of PS1 vs. PS2 values that have been compensated according to Equation (1) using the value of Theta extracted from FIG. 9B. FIG. 10A also includes a plot 1002 of the SIN versus COS components of the uncompensated PS2 signal. As can be seen in plot 1001 of FIG. 10A, both the amplitude and the linearity of the PS1 and PS2 signals has been improved, as indicated by the improved circularity and larger amplitude of the plot 1001 of compensated PS1 vs. PS2 compared to the plot 901 of FIG. 9A. Having a larger amplitude of the PS1 and PS2 signals provides more resolution for better position estimation. Furthermore, the improved linearity of the PS1 and PS2 signals also results in better position estimation. It will also be appreciated that the values shown in plot 1001 are more tightly grouped than the values plotted in FIG. 9A, which indicates that there is less uncertainty/noise in the PS1 and PS2 signal measurements for the phase-compensated signals.

Figure 10B:
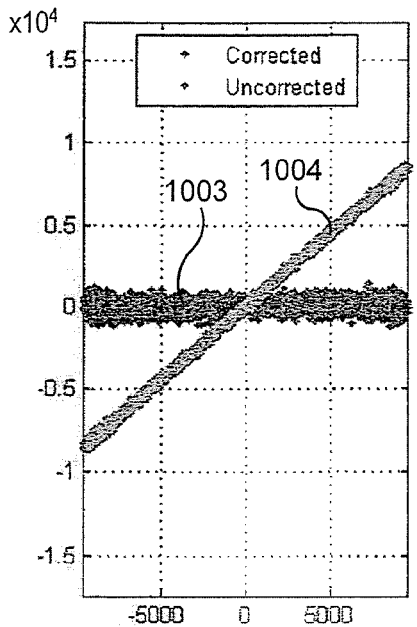

FIG. 10B is a plot of PS2 SIN vs. COS values for an uncompensated system (1004) and a compensated system (1003). As can be seen in FIG. 10B, the plot 1003 of SIN vs. COS values in the compensated falls along a line that has a slope of approximately zero, as would be expected for a system with zero phase error between the burst correlator and the servo bursts in the readback.

Experimental results have also shown a reduction in total PES error of almost 50% for systems with phase compensation of the position signals compared to uncompensated systems. For example, a system with phase compensation according to embodiments of the present invention was measured to have a total PES error, as a percentage of track width, of 8.53% compared to a total PES error of 15.46% for an uncompensated system.

FIGS. 11A, 11B, 12A and 12B provide further illustrations of improvements in position error measurements for systems using phase error compensation according to embodiments of the invention. For example, FIG. 11A is a plot 1101 of PS1 vs. PS2 signals measured for a disc drive with the read/write head following a spiral track without phase compensation. FIG. 11B includes a plot 1102 of a PES signal derived from the PS1 and PS2 signals of FIG. 11A that has been linearized using an NPQS linearization scheme, along with a plot 1103 of the linearized PES signal that has been corrected for demodulator position error attributable to following a spiral track. PES linearization schemes, including NPQS, are described, for example, in U.S. Pat. No. 6,608,477 (Sacks, et al., inventors), the disclosure of which is incorporated herein by reference.

FIG. 12A is a plot 1201 of PS1 vs. PS2 signals measured for a disc drive with the read/write head following a spiral track with phase compensation according to embodiments of the invention. FIG. 12B includes a plot 1202 of a PES signal derived from the PS1 and PS2 signals of FIG. 12A that has been linearized using an NPQS linearization scheme, along with a plot 1203 of the linearized PES signal that has been corrected for demodulator position error attributable to following a spiral track. As can be seen from a comparison of FIGS. 11A, 11B, and 12A, 12B, the use of phase compensation according to embodiments of the invention can reduce variation in the linearized PES signals, which can reduce the total runout. Furthermore, the position signals PS1, PS2, etc., have better linearity and less noise in systems using phase compensation according to embodiments of the invention.

The phase difference Theta can be measured/estimated by other methods. For example, the phase difference can be estimated theoretically from modeling and simulation of the mechanical, electrical and magnetic components of the disc drive. In modeling the phase difference, the model can take into account such factors as analog front-end set up for a demodulator to handle unique servo patterns, expected skew mismatch between the servo track writer and a disc drive, deterministic phase error between the servo burst correlator and the written servo pattern, deterministic and repetitive estimation errors in the servo demodulator phase acquisition or frequency acquisition systems, etc.

Alternatively, the phase delay between the servo readback and the burst correlator in the demodulator can be estimated through the use of a delay line or a programmable digital finite impulse response (FIR) filter, etc. When using a delay line approach, the samples of the servo burst readback are delayed by finite amounts before being sent to the burst correlator. The amplitude of the COS component is monitored to locate a minimum or a maximum which would correspond to the delay being exactly in-phase (correct) or exactly out of phase respectively. This delay value can then be parameterized and stored as a function of radius and/or downtrack location and be applied in the servo demodulator at runtime to correct for the deterministic phase mismatch.

A similar scheme can be implemented by using a digital FIR filter, which is configured to have unity gain but with varying programmable phase delay at the servo burst readback frequency. The phase-delay of the filter is systematically varied till the amplitude of the COS component either goes to a minimum or a maximum resulting when the burst correlator is exactly in-phase (correct) or exactly out-of-phase with the readback signal respectively. The digital FIR coefficients are then parameterized as a function of radius and/or downtrack location and stored. These techniques can be applied entirely in the servo demodulator thereby reducing the processing time and data transfer delays.

Figure 13:
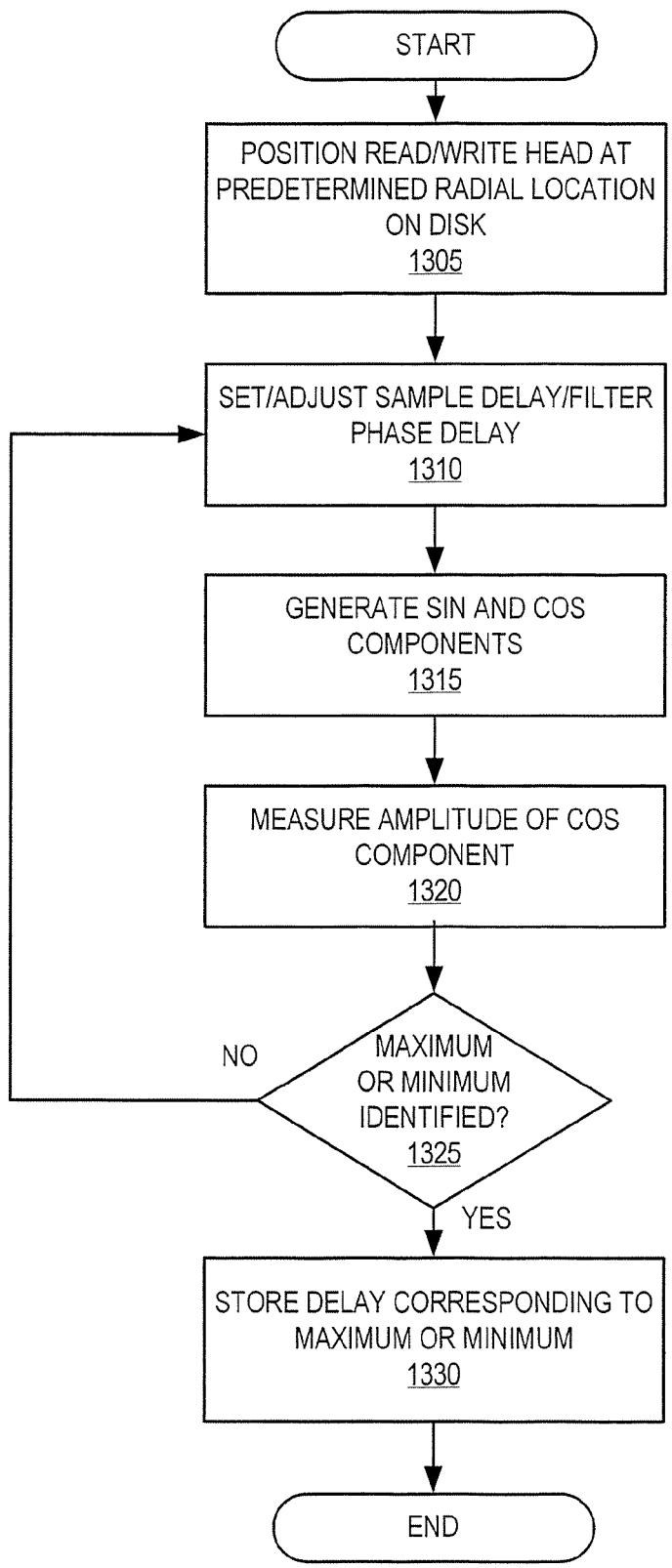
FIG. 13 is a flowchart illustrating systems and/or methods according to some embodiments.

The foregoing approaches are illustrated in the flowchart of FIG. 13. As shown therein, in Block 1305, the read/write head of a disc drive is positioned at a predetermined radial location, for example, a radial location corresponding to a particular track on the disc surface.

A sampling delay/filter phase delay is chosen for the current measurement (Block 1310), and the SIN and COS components of a position signal (PS1, PS2, etc.) are generated in response to servo burst fields in the selected track. (Block 1315). The amplitude of the COS component is measured (Block 1320), and the amplitude is inspected to determine if it has reached a minimum or maximum at the current sampling/phase delay or a previous sampling/phase delay (Block 1325). If not, control returns to Block 1310, where the sampling/phase delay is adjusted, and the SIN and COS components are generated using the new sampling delay.

However, if a maximum or minimum is detected in the COS component, the sampling/phase delay corresponding to the maximum or minimum correlation value is stored as the phase error associated with the selected track (Block 1330). As discussed above, the phase error can be calculated and stored as a function of radial (track) location on the disc and/or downtrack (e.g. wedge) location on the disc.

In the drawings and specification, there have been disclosed typical preferred embodiments and, although specific terms are employed, they are used in a generic and descriptive sense only and not for purposes of limitation, the scope being set forth in the following claims.

What is claimed is:

1. A method, comprising:
estimating a phase difference between two or more components of a position signal in a servo position estimation system, identifying a delay corresponding to at least one of a minimum or a maximum amplitude of at least one of the components of the position signal over delayed samples of a servo burst readback signal; and
correcting the phase difference of the components of the position signal to provide a phase-compensated position signal.

2. The method of claim 1, wherein the components of the position signal comprise orthogonal components, and wherein estimating the phase difference between the components of the position signal comprises measuring the orthogonal components; and fitting a curve to the orthogonal components.

3. The method of claim 2, further comprising taking an inverse tangent of a slope of the line.

4. The method of claim 2, wherein the orthogonal components of the position signal comprise a SIN component and a COS component, and wherein the phase compensated position signal is generated based on the equation:

$$PS=SIN*cos(Theta)+COS*sin(Theta)$$

where PS represents the phase-compensated position signal and Theta represents the phase difference.

5. The method of claim 4, wherein a value of Theta is parameterized and stored in a memory.

6. The method of claim 5, wherein the value of Theta is parameterized as a function of at least one of a downtrack location or a disc radius of a rotatable disc.

7. The method of claim 1, wherein the position signal is indicative of a location of a read/write head relative to one of a plurality of tracks defined on a disc surface, the method further comprising estimating the phase difference as a function of at least one of a radial location or a downtrack location.

8. The method of claim 7, wherein estimating the phase difference as a function of radial track location comprises estimating the phase difference between components of the position signal at a plurality of radial track locations.

9. The method of claim 7, wherein the rotatable disc includes a plurality of servo wedges, wherein the position signal is generated in response to servo information in the servo wedges, and wherein estimating the phase difference as a function of downtrack location comprises estimating the phase difference between components of the position signal at respective ones of the plurality of servo wedges.

10. The method of claim 1, wherein estimating the phase difference between components of the position signal comprises moving a read head to a target track on a rotatable disc, measuring the components of the position signal over a plurality of revolutions of the rotatable disc while the read head is at the target track, and averaging the components of the position signal over the plurality of revolutions of the rotatable disc.

11. The method of claim 1 wherein identifying a delay comprises delaying samples of the servo burst read back signal by a plurality of delays, measuring an amplitude of an orthogonal component of the position signal corresponding to respective ones of the plurality of delays, and identifying the delay of the plurality of delays that corresponds to at least one of the minimum or maximum of the orthogonal component.

12. A method, comprising:
estimating a phase difference between two or more components of a position signal in a servo position estimation system, comprising filtering a read back signal with a filter having a programmable phase delay, measuring an amplitude of an orthogonal component of the position signal corresponding to a phase delay, and identifying a phase delay that corresponds to a minimum or a maximum of the orthogonal component; and
correcting the phase difference of the components of the position signal to provide a phase-compensated position signal.

13. A servo control system, comprising:
a demodulator that demodulates a servo control signal to obtain a position signal including a plurality of signal components; and
a phase correction unit that estimates a phase difference between two or more of the components by identifying a delay corresponding to at least one of a minimum or a maximum amplitude of at least one of the components of the position signal over delayed samples of a servo burst readback signal, and that corrects a phase difference of the components of the position signal to provide a phase-compensated position signal using the estimate of the phase difference.

14. The servo control system of claim 13, wherein the components of the position signal comprise orthogonal components.

15. The servo control system of claim 14, wherein the components of the position signal comprise a SIN component and a COS component wherein the phase correction unit is configured to generate the phase compensated position signal based on the equation:

$$PS=SIN*cos(Theta)+COS*sin(Theta)$$

where PS represents the phase-compensated position signal and Theta represents the estimated phase difference between the components of the position signal.

16. The servo control system of claim 15, wherein the values of sin(Theta) and cos(Theta) are pre-computed and are stored in one or more lookup tables that are referenced by the phase correction unit in response to a radial location of a read/write head on a disc.

17. The servo control system of claim 13, wherein the position signal is indicative of a location of a read/write head relative to one of a plurality of tracks defined on a disc surface, and wherein the estimated phase difference is a function of radial track location.

18. The servo control system of claim 13, wherein the estimated phase difference is a function of downtrack location.

19. The servo control system of claim 14, wherein the phase correction unit is the demodulator.

20. The servo control system of claim 14, wherein the phase correction unit is in a servo controller.

21. A servo control system, comprising:
a demodulator that demodulates a servo control signal to obtain a position signal; and
a phase correction unit that estimates a phase difference between a SIN component and a COS component of the position signal, and that corrects the phase difference to provide a phase-compensated position signal based at least in part on a relation:

$$PS=SIN*cos(Theta)+COS*sin(Theta),$$

where PS represents the phase-compensated position signal and Theta represents the estimated phase difference.

* * * * *